April 5, 1966  L. S. INSCHO, JR  3,244,138
LOW LEVEL LIQUID INDICATOR
Filed April 30, 1964
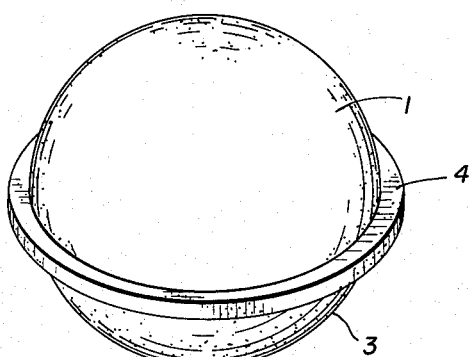
Fig_1
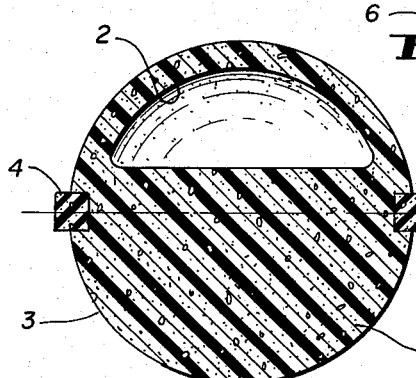
Fig_2
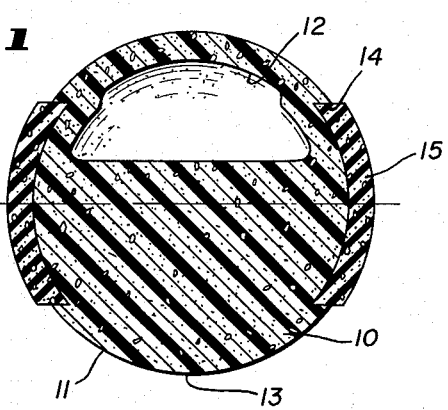
Fig_3
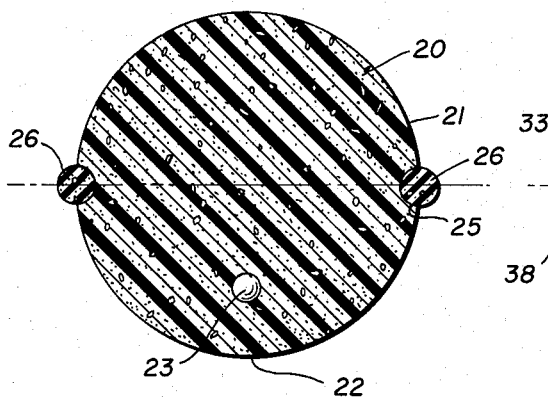
Fig_4
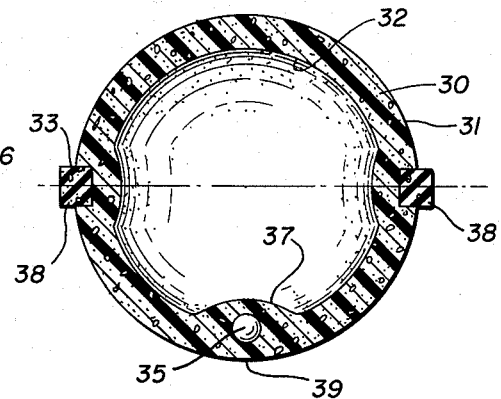
Fig_5
INVENTOR.
Leland S. Inscho, Jr.
BY
McGrew and Edwards
ATTORNEYS

# United States Patent Office 3,244,138
Patented Apr. 5, 1966

3,244,138
LOW LEVEL LIQUID INDICATOR
Leland S. Inscho, Jr., Broomfield, Colo., assignor to Unique Products Co., Broomfield, Colo., a corporation of Colorado
Filed Apr. 30, 1964, Ser. No. 363,698
9 Claims. (Cl. 116—118)

This invention relates to an audible indicator for a low level of liquid in a metal wall vehicle fuel tank.

The fuel gauges on motor vehicles are notoriously poor in accurately indicating the amount of fuel in the tank. Even when the fuel gauge is accurate, many people do not watch the instrument panel to be able to ascertain when the fuel tank is almost empty. In my previous United States Patent No. 3,112,730, I have provided an indicator for low level in a metal fuel tank. While my prior device is very satisfactory for some purposes, it is not particularly adaptable for high speed production, and with certain materials does not perform as well as it should.

Accordingly, it is a major object of this invention to provide an inexpensive, easily produced, audible means for indicating a low level of fuel in the metal wall of the vehicle fuel tank.

Another object of the invention is to provide a low level fuel indicator which is placed in the fuel tank and remains in the fuel tank for the life of the tank and indicates only a low level of fuel in the tank on movement of the tank.

In a preferred embodiment of the invention the indicator is a spherical member arranged to float on fuel and it is arranged with a heavy side so that it floats with the heavy side down. It is, additionally, provided with an equatorial band of resilient, soft material which produces no sound when it strikes a metal walled container. The body is made of a foamed hard plastic which produces an audible sound when it strikes the metal.

Other objects and features of the invention will become apparent to those skilled in the art from a study of the following description and appended drawings, in which:

FIG. 1 is a perspective view of one form of the low fuel indicator according to the invention;

FIG. 2 is a cross-sectional view of a spherical member according to the invention;

FIG. 3 is a cross-sectional view of a modified form of the invention;

FIG. 4 is a cross-sectional view of a still further modified form of the invention, utilizing a solid foamed plastic sphere with a heavy weight at one side for making the device float with the weight down; and FIG. 5 is an additional modified form, shown in cross-section, of an indicator according to the invention.

In the device illustrated in FIGS. 1 and 2 a spherical body 1 is made of a molded foam plastic, which has a substantially complete spherical surface, but internally includes a void 2 molded therein. The material is, at least on the surface 3, sufficiently dense to prevent liquid entering into the pores. The majority of the voids in the material, however, are completely closed so that the material is essentially non-absorbent. The hardened surface is made in the mold and it is sufficiently hard to produce a ringing sound when it strikes a metal object. The void is easily molded into the material by utilizing only as much plastic as is necessary to produce the sphere leaving a large void. A preferred plastic for making the spheres is rigid polyurethane foam.

Around an equator of the sphere 1 is a groove 5 which is molded in the plastic, and a square-cross section O-ring 4 is mounted in the equatorial groove 5. The ring 4 should be of such a size that it is a snug fit in the groove. This ring is preferably made of buna-N rubber.

In the device shown in FIG. 3 the indicator is made of a spherical body 10 which is a foam plastic having a myriad of voids in the foam, and each of the voids internally of the material is completely close so that the body is essentially non-absorbent. The sphere is provided with a hardened surface 11 and a large void 12, which is filled with a gas, and formed by centrifuge molding. The void causes the sphere to ride in fuel with the lower end 13 down. A wire ring or band 15 is molded in the plastic around one equator so that the top of the void 12 is at approximately 90° to the axis through this equator axis. The band 15 seats tightly in a formed groove 14. The band should be of a soft resilient material which does not make any noise on striking the solid object and particularly metal. The ring 15 may effectively be of a buna-N rubber, and it should be a snug fit on the sphere so that it is not easily removed and will not slip off when lubricated by the fuel. Preferably, the band covers from about 5 to 120 spherical degrees of surface. As shown, about 90 spherical degrees is satisfactory.

In the modified form shown in FIG. 4, a sphere 20 is made of a foamed plastic completely filling the sphere with a hardened surface 21. The sphere again is generally impervious to the fuel and will not absorb the fuel. The plastic is lighter than the fuel and will float on the fuel. To hold the sphere in one floating position a ball of ballast 23, which may be lead shot or the like, is molded into the plastic near a bottom portion 22 of the sphere which is generally 90° to the axis of the equator of the sphere. A semicircular groove 25 is molded in the sphere around the equator and an O-ring 26 is placed in a snug fit in the groove 25. This ring is a soft, resilient ring, as specified above, to prevent noise being made when the ball strikes the side of a metal tank.

In the modification shown in FIG. 5, a hollow sphere 30 has a molded shell of the hard foamed plastic with an essentially hard surface 31. The large void of gas 32 constitutes the major portion of the structure. A groove 33 is molded around an equator of the sphere with a slight internal bulge 34 so that the thickness of the material between the groove and the internal portion of the sphere is sufficient to prevent easy breaking. A lead shot 35 is molded in the lowermost portion of the sphere, approximately 90° to the equator through the sphere. The lead shot provides ballast for the sphere so that it floats with the lowermost portion downwardly. Again a slight bulge 37 is molded in the bottom to provide for the plastic around the shot 35. A quadrangular shaped ring 38, preferably of buna-N rubber or the like which is impervious to the fuel, is molded in place on the sphere in a groove 33. The ring 38 should be sufficiently small to form a tight fit in the groove so that it will not be easily removed when wetted by the fuel.

In these cases the sphere is simply made by centrifugal molding of the foam material to form a wall of sufficient thickness and, after forming the wall, the sphere is permitted to sit, forming the void when the change is less than the volume of mold. In some instances, the material by standing, after centrifuging, is more dense on one side so that it floats down. With the gas space and/or the shot, the sphere, also, rides with its heavy hemisphere down so that the hard surface of the lowermost part of the sphere strikes the bottom of the fuel tank. The resilient band of material prevents noise from being produced if the ball strikes the side of the fuel tank. Motion of the vehicle, of course, sloshes the fuel around in the fuel tank, and the ball will strike the bottom when the fuel level is low.

The illustrations show various modifications of the device, but it is intended that the various parts may be interchanged to produce other modifications. For example, the wide band of FIG. 3 may be used on all the various constructions of spheres, this wider band providing a wider surface of resilient material to prevent sounds when the sphere strikes the side. Also, to prevent undue tilting motion, a ballast may be used in any of the constructions, etc.

While the invention has been described with reference to particular embodiments, there is no intent to limit the spirit or scope of the invention to the precise details set forth except insofar as defined in the following claims.

I claim:

1. An audible indicator for a low level liquid in metal walled vehicle fuel tanks comprising a generally smooth surface spherical body having no protrusions and having a specific gravity which is less than the fuel in which it is to be used, said body being rigid hard plastic imperforate and impervious to vehicle fuel and capable of making an audible sound when it strikes a metal walled fuel tank, a band of soft resilient material encircling said sphere and covering a portion of the area on either side of the equator line centerwise of said band, said band arranged to leave an area of hard plastic exposed on the lowermost portion of the sphere when floating, and said sphere being constructed and arranged to be a free floating body in the fuel with the exposed hard area down and said band horizontal so as to produce an audible noise from the sphere striking the bottom wall of the tank and not when it strikes a side of the tank 2. An indicator according to claim 1 in which the plastic is a foamed plastic.

3. An audible indicator for a low level liquid in metal walled vehicle fuel tanks comprising a generally smooth surface spherical body having no protrusions and having a specific gravity which is less than the fuel in which it is to be used, said body being rigid hard plastic imperforate and impervious to vehicle fuel and capable of making an audible sound when it strikes a metal walled fuel tank, a band of soft resilient material encircling said sphere and covering a substantial portion of the area on either side of the equator line centerwise of said band, said sphere being arranged to be a free floating body and heavier on one side of said band than on the other side so that the sphere floats with the heavy side down at substantially all times and with the band horizontal so as to prevent noise when said indicator strikes a side of the tank, and said band arranged to leave an area of hard plastic exposed on the lowermost portion of the sphere when floating.

4. An indicator according to claim 3 in which said band covers from about 5 to 120 spherical degrees of surface.

5. An indicator according to claim 3 in which said band covers about 90 spherical degrees of surface.

6. An audible indicator for a low level liquid in metal walled vehicle fuel tanks comprising a generally smooth surface spherical body arranged to be a free floating body and having a specific gravity which is less than the fuel in which it is to be used, said body being rigid hard plastic imperforate and impervious to vehicle fuel and capable of making an audible sound when it strikes a metal walled fuel tank, a band of soft resilient material encircling said sphere and covering a portion of the area on either side of the equator line centerwise of said band, said sphere having a substantial gas filled void internally thereof and being heavier on one side of said band than on the other side so that the sphere floats with the heavy side down at substantially all times and with the band horizontal so as to prevent noise when said indicator strikes a side of the tank, and said band arranged to leave an area of hard plastic exposed on the lowermost portion of the sphere when floating.

7. An indicator according to claim 6 in which said void internally of said sphere is substantially in the upper hemisphere above said band.

8. An indicator according to claim 6 in which ballast is placed in one hemisphere at about 90° to an equator through said band.

9. An audible indicator for a low level liquid in metal walled vehicle fuel tanks comprising a generally smooth surface spherical body arranged to be a free floating body and having a specific gravity which is less than the fuel in which it is to be used, said body being rigid hard foamed plastic imperforate and impervious to vehicle fuel and capable of making an audible sound when it strikes a metal walled fuel tank, a band of soft resilient material encircling said sphere and covering a portion of the area on either side of the equator line centerwise of said band, said sphere being a relatively thin walled shell and ballasted on one hemisphere at about 90° to the equator through said band so that the sphere floats with its heavy side down at substantially all times and with the band horizontal so as to prevent noise when said indicator strikes a side wall of the tank, said band arranged to leave an area of hard plastic exposed on the ballasted portion of the sphere when floating so as to produce an audible noise from the sphere striking the bottom wall of the tank.

References Cited by the Examiner

UNITED STATES PATENTS

| 2,342,487 | 2/1944 | Posado | 116—110 |
| 2,607,153 | 8/1952 | Lombach | 43—43.1 |
| 2,660,194 | 11/1953 | Hoffman | 73—322.5 |
| 3,112,730 | 12/1963 | Inscho | 116—110 |
| 3,133,440 | 5/1964 | Conkling | 73—322.5 |

LOUIS J. CAPOZI, *Primary Examiner.*